United States Patent Office 3,184,431
Patented May 18, 1965

3,184,431
PROCESS FOR THE PRODUCTION OF POLYCARBONATE RESINS USING TWO-STEP ADDITION OF CATALYST
Rudolph D. Deanin, West Hartford, Conn., and Joseph O. Berry, Jr., Randolph Township, Morris County, and Lloyd R. Moore, Parsippany Township, Morris County, N.J., assignors to Allied Chemical Corporation, New York, N.Y., a corporation of New York
No Drawing. Filed Nov. 25, 1960, Ser. No. 71,412
6 Claims. (Cl. 260—47)

The present invention relates to a process for the preparation of polycarbonate resins by the phosgenation of dihydroxy phenols in an aqueous alkaline medium and in the presence of a catalyst, especially the phosgenation of di-monohydroxyaryl-alkanes such as 2,2-(4,4'-dihydroxydiphenyl)-propane, also known as p,p'-isopropylidenediphenol, hereinafter referred to as Bis-phenol-A.

Polycarbonate resins may be conventionally prepared by reacting phosgene and Bis-phenol-A in an aqueous alkaline solution and in the presence of a catalyst. In order to obtain good molecular weight growth a solvent for the polycarbonate resin is preferably employed. The solvent retains the polycarbonate resin in solution where molecular weight growth of the resin occurs. If no solvent is employed only low molecular weight polymer is produced and this polymer precipitates from solution substantially as fast as formed. After the phosgene has been introduced a molecular weight growth period follows, during which the reaction mixture is stirred and growth to higher molecular weight occurs. The resulting polycarbonate resin may be recovered from solution by conventional means, such as the addition of a non-solvent for the polycarbonate resin, thus precipitating the resin.

In the foregoing process the phosgene is preferably slowly added to an aqueous alkaline solution containing Bis-phenol-A. The catalyst, generally a quaternary ammonium compound, is conventionally added to the reaction mixture either before introduction of any phosgene or after all of the phosgene has been introduced. This procedure is subject to numerous disadvantages.

When a small amount of catalyst is added before the phosgene has been introduced the growth of the polymer chain is slow, and long post-phosgenation treatment at elevated temperatures (generally reflux) is required in order to obtain the desirable high molecular weight. If a large amount of catalyst is added to the reaction mixture prior to the introduction of the phosgene the growth to the desirable high molecular weight is difficult to control, that is, reproducible molecular weights are difficult to obtain, even when a chain terminator is used to control the molecular weight. In addition, there is a waste of raw material utilized as chain terminator, for example, when phenol is used as a chain terminator there would be a catalyzed side reaction between the phenol and phosgene to give di-phenyl carbonate.

When all of the catalyst is added after phosgenation, whether high or low amounts of catalyst are employed, the growth of the polymer chain is variable and chain terminators do not predictably control molecular weight. In addition there is a high waste of phosgene by side reaction with the caustic soda present, resulting in a formation of sodium carbonate and sodium chloride, and also a waste of the valuable dihydroxy phenol by incomplete phosgenation.

The foregoing disadvantages are significant factors in the economics of polycarbonate production. It is, therefore, highly desirable to overcome one or more of the foregoing difficulties.

Accordingly, it is an object of the present invention to provide a process for the preparation of polycarbonate resins by the phosgenation of di-monohydroxyarylalkanes, especially Bis-phenol-A.

It is a further object of the present invention to produce polycarbonate resins of controlled molecular weight.

It is a still further object of the present invention to provide a process for the production of polycarbonate resins which provides rapid growth to the desired high molecular weight.

It is an additional object of the present invention to produce polycarbonate resins in short operating cycles and at low temperature.

It is an additional object of the present invention to devise a process for the preparation of polycarbonate resins which is characterized by low raw material waste.

Further objects and advantages of the present invention will appear hereinafter.

In accordance with the present invention it has been found that polycarbonate resins may be obtained, accomplishing the aforementioned objects of the present invention, by (I) adding phosgene to an aqueous alkaline solution containing a di-monohydroxyaryl-alkane and an inert organic solvent which is immiscible in the aqueous phase, (II) stirring the reaction mixture, and (III) recovering the resulting polycarbonate resin, wherein the reaction is conducted in the presence of a catalytic amount of a quaternary ammonium compound as catalyst, from about 30 to about 50 percent of said catalyst being present during the phosgenation reaction, and the remainder of said catalyst being added after completion of phosgene reaction. The fact that the aforementioned disadvantages of the art can be overcome by the process of the present invention is surprising and unexpected and represents a significant advance.

A catalytic amount of quaternary ammonium compound may be utilized in the process of the present invention. The ammonium compound itself may be in the form of a free base or in the form of a salt. Mixtures of quaternary ammonium compounds may also be advantageously employed. The amount of catalyst employed is preferably from about 0.3 to about 5.0 percent by weight based on the dihydroxy phenol.

It is preferred in the process of the present invention to add the entire 30 to 50 percent portion to the reaction mixture before any phosgene has been introduced.

The preferred catalyst in the process of the present invention is benzyl triethyl ammonium chloride; however, any of the quaternary ammonium compounds conventionally used as polycarbonate catalysts may be advantageously employed in the process of the present invention. Exemplificative catalysts include the following: tetramethyl ammonium hydroxide; octadecyl triethyl ammonium chloride; benzyl trimethyl ammonium fluoride; dodecyl trimethyl ammonium chloride; benzyl phenyl dimethyl ammonium chloride; cyclohexyl trimethyl ammonium bromide; and N-methyl pyridinium chloride.

The phosgene-dihydroxy phenol ratio is not critical. Practically, however, at least 0.1 mole of phosgene is employed per mole of dihydroxy phenol. Theoretically an equimolar ratio of phosgene to dihydroxy phenol is required for complete conversion of the dihydroxy phenol to polycarbonate; however, in order to compensate for loss of phosgene by side reactions, the normal operation utilizes more than one mole of phosgene per mole of dihydroxy phenol. It has been found that the preferred ratio is from about 1.1 to about 1.5 moles of phosgene per mole of dihydroxy phenol. If less than one mole of phosgene is employed, correspondingly less of the dihydroxy phenol will be converted to polycarbonate. If too much phosgene is employed the extra phosgene will merely be unconsumed.

It should be noted that the phosgene waste and dihydroxy phenol waste are related, since when phosgene is wasted by side reactions there will be less phosgene available to react with the dihydroxy phenol, increasing the tendency on the part of the latter to remain unreacted.

In the preferred embodiment the phosgene is slowly added to the aqueous alkaline solution containing the dihydroxy phenol, the solvent, and the chosen proportion of catalyst. The minimum time of addition will naturally vary depending upon the size of the run, the reaction conditions and whether or not the process is operated continuously. It has been found, however, that the best results are obtained when the time of addition of the phosgene is at least 15 minutes. Similarly the maximum time of addition is not critical and will vary depending upon the above factors; it has been generally found, however, that it is preferred to add the phosgene in less than four hours. It is to be naturally understood that in a continuous operation the phosgene will be continuously introduced, with the reaction mixture being drawn off at convenient intervals and transferred to a separate reactor for post-phosgenation stirring.

The aqueous alkaline solution may be formed from an alkali metal base, preferably employing an excess of base, such as lithium, sodium, or potassium hydroxide. In the aqueous alkaline solution the alkali metal salt of dihydroxy phenol is formed; therefore, the alkali metal salt may be added directly to the aqueous alkaline solution instead of adding the individual components.

The polymer should be soluble in the solvent which is employed, and the solvent should be substantially inert under the conditions of the reaction, immiscible in water and have a sufficiently high boiling point to allow for reaction at elevated temperatures, if desired. Generally speaking, it is preferred to employ a solvent which has a boiling point of from about 30° C. to about 80° C. The solvent is added prior to the introduction of phosgene, and added in amounts so that the final polymeric solution is fluid. The amount of solvent is not critical, but practically from two to 500 parts by weight of solvent based on the polycarbonate formed should be used. Typical solvents which may be employed include the following organic solvents: methylene chloride; ethylene chloride; benzene; methylcyclohexane; cyclohexane; toluene; xylene; chloroform; carbon tetrachloride; trichloroethylene; perchloroethylene; etc.

In the di-monohydroxyaryl-alkanes to be used the two aryl radicals may be identical or different. Furthermore, the aryl radicals may contain substituents which cannot react during the conversion into polycarbonates, such as halogen or alkyl groups, e.g., methyl, ethyl, propyl or tert-butyl groups. The alkyl radical of the di-monohydroxyaryl-alkanes linking the two benzene rings may consist either of an open chain or of a cycloaliphatic ring.

The following are examples of such di-monohydroxyaryl-alkanes:

Bis-phenol-A,
(4,4'-dihydroxy-diphenyl)-methane,
1,1-(4,4'-dihydroxy-diphenyl)-cyclohexane,
1,1 - (4,4' - dihydroxy - 3,3' - dimethyl-diphenyl)-cyclohexane,
2,2-(2,2'-dihydroxy-4,4'-di-tert-butyl-diphenyl)-propane,
3,4-(4,4'-dihydroxy-diphenyl)-hexane,
1,1-(4,4'-dihydroxy-diphenyl)-1-phenyl-ethane,
2,2-(4,4'-dihydroxy-diphenyl)-butane,
2,2-(4,4'-dihydroxy-diphenyl)-pentane,
3,3-(4,4'-dihydroxy-diphenyl)-pentane,
2,2-(4,4'-dihydroxy-diphenyl)-3-methyl-butane,
2,2-(4,4'-dihydroxy-diphenyl)-hexane,
2,2-(4,4'-dihydroxy-diphenyl)-4-methyl-pentane,
2,2-(4,4'-dihydroxy-diphenyl)-heptane,
4,4-(4,4'-dihydroxy-diphenyl)-heptane, and
2,2-(4,4'-dihydroxy-diphenyl)-tridecane.

These compounds can easily be produced in conventional fashion by condensation of aldehydes or ketones with phenols.

Mixtures of the aforementioned dihydroxy phenols may also be advantageously employed.

Potential chain terminators may be employed in the process of the present invention in order to limit the molecular weight. Typical of such compounds are phenol, tertiary butyl phenol, chlorophenol, nonyl alcohol, butyl alcohol, etc.

Various additives may be employed, such as antioxidants, and additives to preferentially react with phosgene decomposition products. Typical of such additives are sodium dithionite, potassium bisulfite, carbon monoxide, etc.

The temperature of the reaction may vary within a wide range, that is, the reaction may be conducted at room temperature or lower or higher temperatures as desired. Generally temperatures from the freezing point to the boiling point of the mixture may be utilized. In addition the reaction may be conveniently conducted at atmospheric pressure.

After the phosgene has been introduced the reaction mixture is generally stirred to allow molecular weight growth of the polycarbonate in solution. It is an advantage of the present invention that high molecular weights are obtained utilizing short post-phosgenation stirring periods at low temperatures. Naturally, extended post-phosgenation periods may be employed, if desired. In addition elevated temperatures may also be employed, if desired, in order to still further reduce the post-phosgenation stirring time. Generally, however, it is preferred to employ a post-phosgenation stirring period of from about 15 minutes to about two hours and a post-phosgenation temperature of from about 30° C. to about 80° C.

When the post-phosgenation period has been completed, the polycarbonate resin may be recovered from the organic phase by conventional means, for example, by the addition of a non-solvent for the polycarbonate resin, thereby precipitating the polycarbonate from solution. Typical non-solvents include methanol, isopropanol, etc. Alternatively, the polycarbonate resin may be recovered by steam distillation or evaporation of the solvent.

The polycarbonates obtained by the present process have the desirable characteristics of polycarbonates, and may be easily processed into valuable formed articles or coatings by compression molding, extrusion, injection molding or flame spraying. The polycarbonates obtained by the present process can also be processed into films and fibers, which can be oriented by stretching. By this stretching operation the strength of these products is considerably increased, while elongation is decreased. The polycarbonates produced by the present process can also be processed in combination with plasticizers or with fillers such as asbestos or glass fibers.

The present invention will be further illustrated by consideration of the following examples. In the following examples the molecular weight was determined as follows: the dilute solution intrinsic viscosity of a 0.1 percent solution of the polymer in ethylene chloride was measured in Ostwald-Fenske viscometer at 25° C., and molecular weight calculated from the following equation wherein $\eta_i$ is viscosity:

$$\eta_i = 1.23 \times 10^{-4} MW^{0.83}$$

Example 1

A 1-liter resin pot fitted with stirrer, reflux condenser, thermometer, and gas inlet dip tube was charged with 500 cubic centimeters of water, 31.5 grams of 95 percent $N_aOH$, and 57 grams of Bis-phenol-A, producing a warm aqueous solution of sodium bisphenate. The solution was cooled to room temperature, and 500 cubic centimeters of methylene chloride containing 0.64 gram of phenol was added, followed by 1.9 cubic centimeters of 10 percent aqueous benzyl triethyl ammonium chloride catalyst. Phosgene in amount of 26 grams was bubbled into the emulsion at a steady rate over a period of one hour, with stirring and cooling to keep the reaction at 30° C. After all of the phosgene had been added another 4.5 cubic centimeters of 10 percent aqueous benzyl triethyl ammonium chloride catalyst was added, and the mixture was stirred another hour at 30° C. The aqueous layer was then separated, acidified, filtered, dried and weighed to determine the amount of residual unpolymerized Bisphenol-A. The methylene chloride solution of polymer was separated, washed with dilute HCl and water, precipitated by dropwise addition of 400 cubic centimeters of acetone and 500 cubic centimeters methanol with stirring, filtered, and dried overnight at 120° C. In this typical experiment, there was no residual unpolymerized Bisphenol-A, and the polymer had a molecular weight of 31,000.

The following examples repeat the procedure of Example 1, using different amounts of phenol chain terminator to control molecular weight.

| Example | Grams phenol | Molecular weight |
|---|---|---|
| 2 | 1.2 | 20,000 |
| 3 | 0.64 | 31,000 |
| 4 | 0.43 | 46,000 |
| 5 | 0.21 | 100,000 |

The resulting molecular weights are close to molecular weight averages predicted from the mole ratio of phenol chain terminator to Bis-phenol, showing molecular weight reproducibility.

The following examples repeat the procedure of Example 1, using different amounts of catalyst before and after phosgenation.

| Example | Percent catalyst before phosgene | Percent catalyst after phosgene | Molecular weight | Residual Bis-phenol-A, percent |
|---|---|---|---|---|
| 6 | none | 100 | 17,000 | 14 |
| 7 | 10 | 90 | 22,000 | 3 |
| 8 | 30 | 70 | 31,000 | 0 |
| 9 | 50 | 50 | 60,000 | 2 |

The above examples show that there is a direct relationship between proportion of catalyst charged before phosgenation and molecular weight which resulted. Thus it is possible to control molecular weight in this way, as well as by varying phenol content. It should be noted in passing that in Example 6 above phosgenation without catalyst caused excessive waste of phosgene consumed in side reactions, leaving high residual unpolymerized Bis-phenol-A, and severely limiting catalyzed post-phosgene growth. It should also be noted that when 100 percent of the catalyst was added before phosgenation there was a large amount of residual unpolymerized Bis-phenol-A, i.e., 6 percent.

The following examples repeat the procedure of Example 1, with and without the post-phosgene addition of catalyst, taking samples periodically during post-phosgene growth to determine molecular weight.

| Example | Percent catalyst added after phosgene | Reaction time after phosgene | Molecular weight |
|---|---|---|---|
| 10 | none | 0 hr./36° C | 5,000 |
| 11 | none | ¼ hr./36° C | 6,000 |
| 12 | none | 1 hr./36° C | 18,000 |
| 13 | none | 2 hr./36° C | 22,000 |
| 14 | 70 | 0 hr./30° C | 7,000 |
| 15 | 70 | ½ hr./30° C | 27,000 |
| 16 | 70 | 1 hr./30° C | 31,000 |

The above examples show that post-phosgene addition of catalyst produces faster and more complete growth at lower temperature, an important factor in the economics of large-scale operation.

*Example 17*

Example 1 was repeated, scaled up 225-fold in a 100-gallon glass-lined autoclave. The resulting reaction left three percent of residual, unpolymerized Bis-phenol-A and produced a polymer of molecular weight of 33,000. Thus the system scaled up very successfully, requiring no adjustments to give equally good results.

This invention may be embodied in other forms or carried out in other ways without departing from the spirit or essential characteristics thereof. The present embodiment is, therefore, to be considered as in all respects illustrative and not restrictive, the scope of the invention being indicated by the appended claims and all changes which come within the meaning and range of equivalency are intended to be embraced therein.

We claim:
1. A process for the preparation of a polycarbonate resin which comprises (1) adding phosgene to an aqueous alkaline solution containing a di-monohydroxaryl-alkaline and an inert organic solvent which is immicible in the aqueous phase, (II) stirring the reaction mixture, (III) recovering the resulting polycarbonate resin, wherein the reaction is conducted in the presence of a catalytic amount of a quaternary ammonium compound as a catalyst, from 30 to 50 percent of said catalyst being present during the phosgenation reaction, and the remainder of said catalyst being added after completion of the phosgenation reaction.

2. A process according to claim 1 wherein from 0.3 to 5.0 percent by weight of catalyst is employed.

3. A process according to claim 2 wherein the phosgene is slowly added to said aqueous alkaline solution over a period of at least 15 minutes.

4. A process according to claim 3 wherein from about 1.1 to about 1.5 moles of phosgene is slowly added to said aqueous alkaline solution.

5. A process according to claim 3 wherein said di-monohydroxyaryl-alkalne is 2,2 - (4,4' - dihydroxy - diphenyl)-propane.

6. A process according to claim 3 wherein said quaternary ammonium compound is benzyl triethyl ammonium chloride.

References Cited by the Examiner

UNITED STATES PATENTS 2,964,794 12/60 Peilstocker _____ 260—47
2,970,131 1/61 Moyer _____ 260—47

WILLIAM H. SHORT, *Primary Examiner.*

H. N. BURSTEIN, LOUISE P. QUAST, *Examiners.*

UNITED STATES PATENT OFFICE
CERTIFICATE OF CORRECTION

Patent No. 3,184,431  May 18, 1965

Rudolph D. Deanin et al

It is hereby certified that error appears in the above numbered patent requiring correction and that the said Letters Patent should read as corrected below.

Column 2, line 1, for "di-monohydroxyarylalkanes" read -- di-monohydroxyaryl-alkanes --; column 6, line 35, for "di-monohydroxaryl-alkalıne" read -- di-monohydroxyaryl-alkane --; line 36, for "immicible" read -- immiscible --; line 53, for "-alkalne" read -- -alkane --.

Signed and sealed this 5th day of April 1966.

(SEAL)
Attest:

ERNEST W. SWIDER  
Attesting Officer

EDWARD J. BRENNER  
Commissioner of Patents